Figure 1:
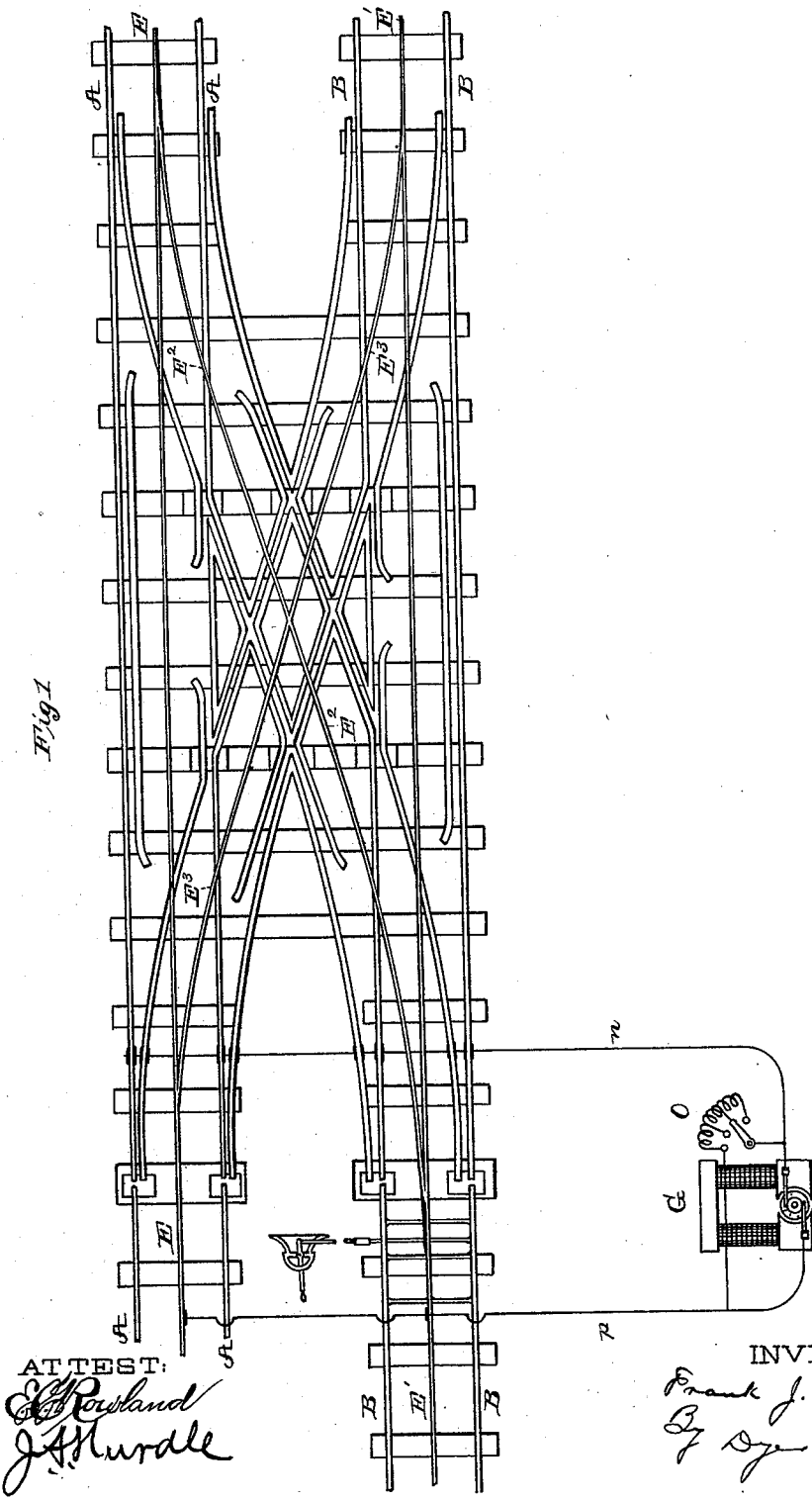

(No Model.)

5 Sheets—Sheet 1.

F. J. SPRAGUE.
ELECTRIC RAILWAY SYSTEM.

No. 408,544.

Patented Aug. 6, 1889.

ATTEST:

INVENTOR:

(No Model.) 5 Sheets—Sheet 2.
F. J. SPRAGUE.
ELECTRIC RAILWAY SYSTEM.
No. 408,544. Patented Aug. 6, 1889.
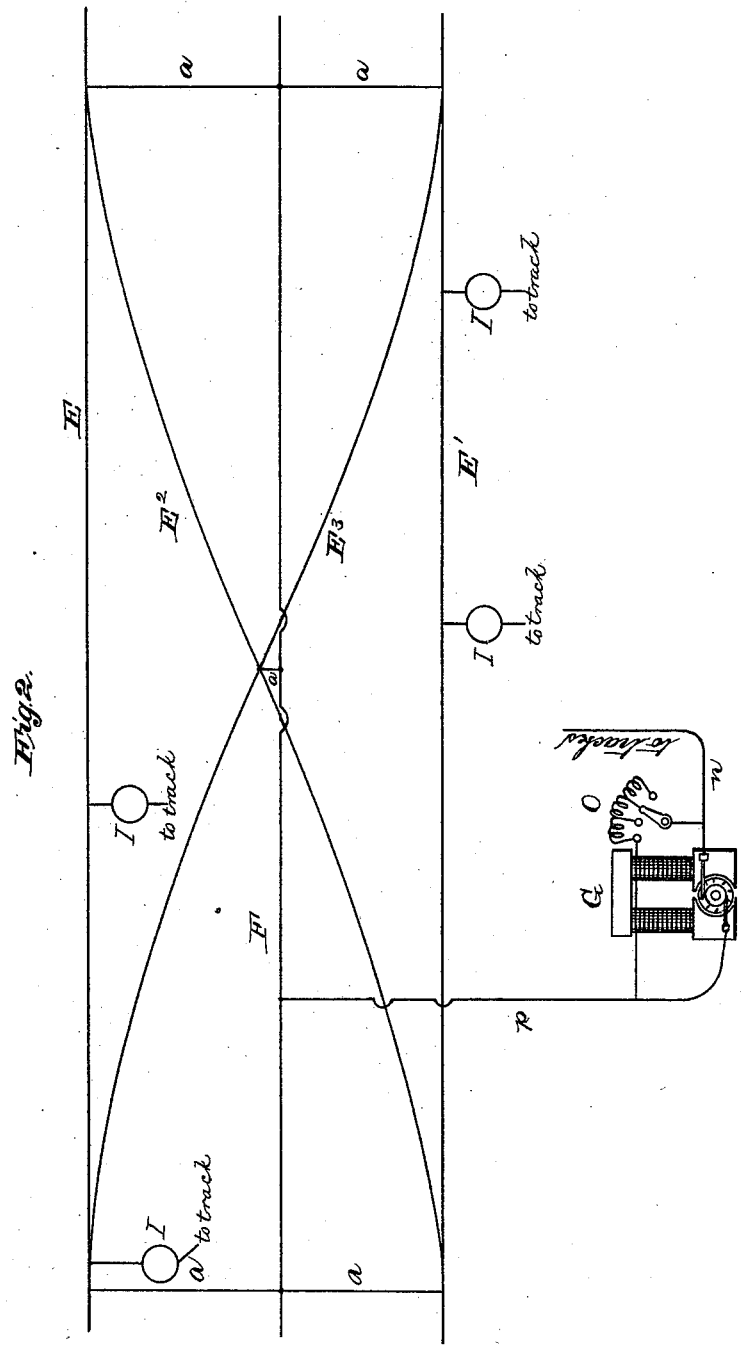
ATTEST: INVENTOR:

(No Model.)   5 Sheets—Sheet 3.
F. J. SPRAGUE.
ELECTRIC RAILWAY SYSTEM.
No. 408,544. Patented Aug. 6, 1889.
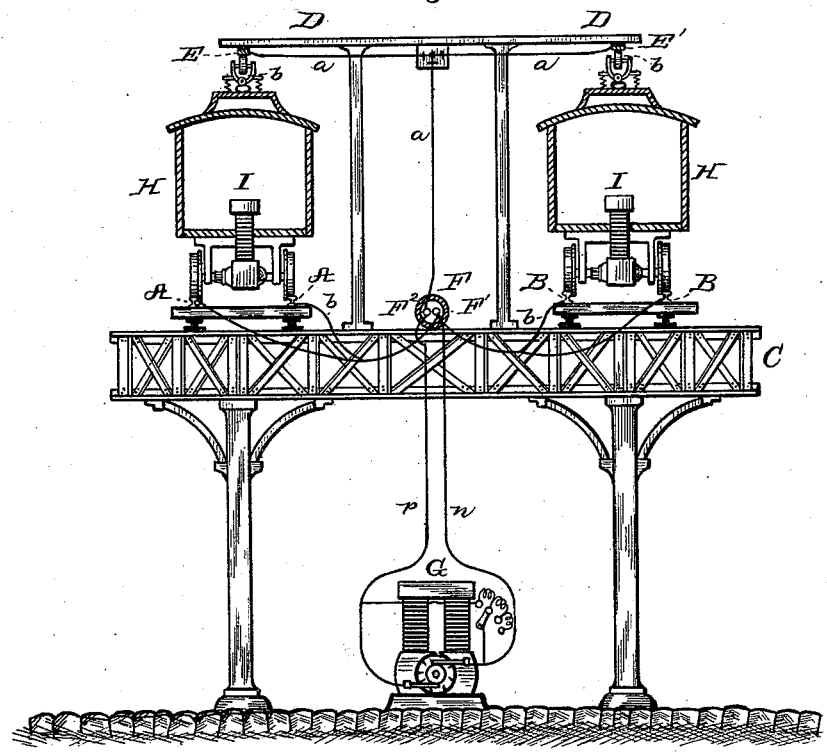
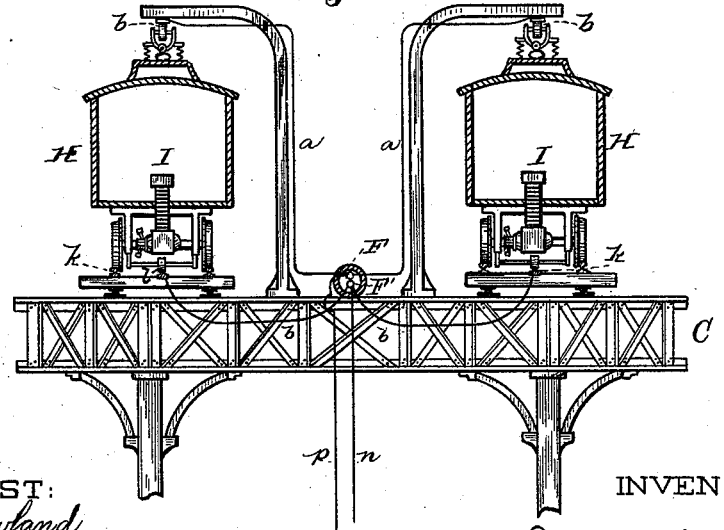
ATTEST:
E. Rowland
J. A. Nurdle
INVENTOR:
Frank J. Sprague
By Dyer & Seely
Att'ys (No Model.)  5 Sheets—Sheet 4.
F. J. SPRAGUE.
ELECTRIC RAILWAY SYSTEM.
No. 408,544.  Patented Aug. 6, 1889.
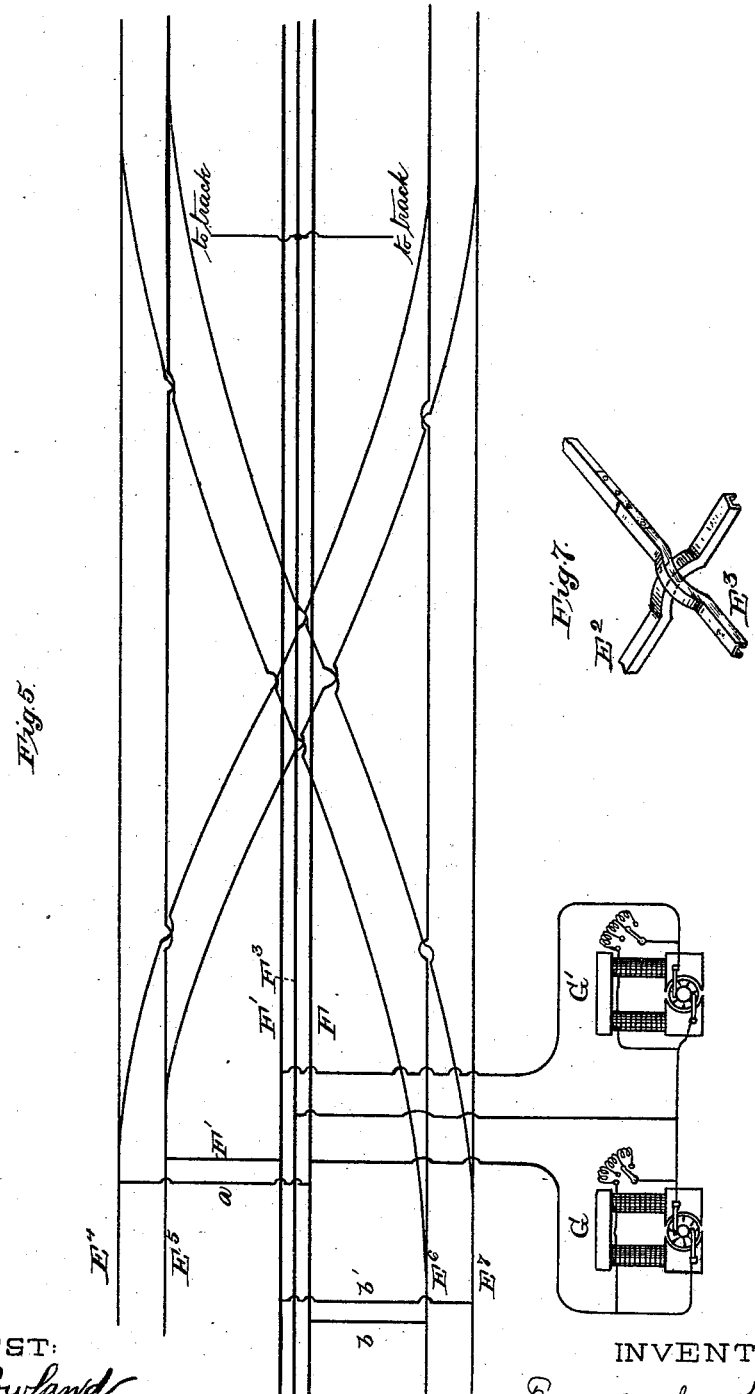
ATTEST:  INVENTOR:

(No Model.) 5 Sheets—Sheet 5.
F. J. SPRAGUE.
ELECTRIC RAILWAY SYSTEM.
No. 408,544. Patented Aug. 6, 1889.
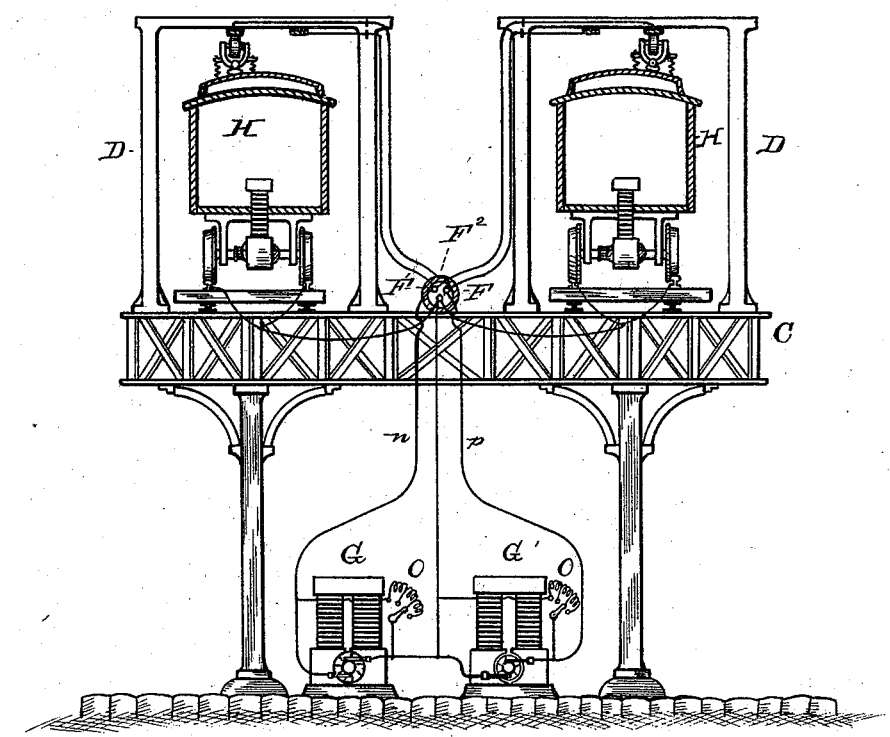
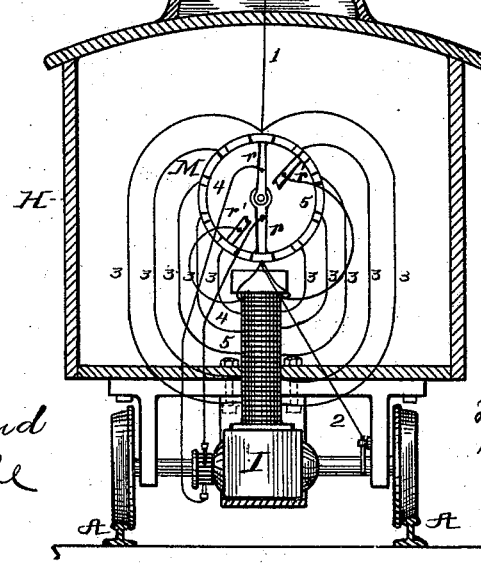
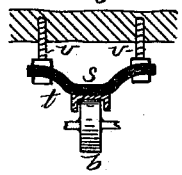
ATTEST: INVENTOR:

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY.

ELECTRIC-RAILWAY SYSTEM.

SPECIFICATION forming part of Letters Patent No. 408,544, dated August 6, 1889.

Application filed February 27, 1885. Serial No. 157,273. (No model.)

*To all whom it may concern:*

Be it known that I, FRANK J. SPRAGUE, of New York, in the county and State of New York, have invented a certain new and useful Improvement in Electric-Railway Systems, (Case S,) of which the following is a specification.

The object of my invention is to provide a simple and at the same time highly-efficient system for the propulsion of railway-trains by electricity, and one which can readily be applied to any railway now in use without in any way altering the present construction or arrangement of the tracks, switches, or road-bed, and without necessitating any change in the rolling-stock used, except of course the substitution of moving electric motors for locomotive steam-engines.

While, as just stated, my invention is applicable to any railway, it is more especially designed for elevated railways and for underground railways.

In carrying my invention into effect I make use of one or more conductors situated overhead above the motor or motors forming one side of a circuit, and one or more conductors situated beneath the motor or motors and forming the opposite side of the circuit, one terminal of each motor making an upward-pressure contact upon the overhead conductor or conductors, and the other terminal a lower contact upon the underneath conductor or conductors, whereby circuit is completed between the two sides, the motors being thus connected in multiple arc to each other. The underneath conductors are preferably the two main or traffic rails of the track, with which the motor makes contact through its wheels. The overhead conductor is supported rigidly above the track and follows the direction of such track, so that the motor running upon the track constantly maintains circuit between the two sides of the system. In a system having two or more tracks an overhead conductor follows each track, and all these overhead conductors form one side of the system, while all the track-rails form the other side. When switches extend from one track to another, the overhead conductor branches and a conductor follows the switch-track, so that when the motor leaves the main track and passes upon the switch its contact, bearing on the lower side of the overhead conductor, follows upon the branch conductor to the other track. It will be seen, then, that to adapt an existing railway to my system it is necessary only to place overhead upon suitable supports a suitable conductor and cause the same to follow all the tracks and switches of the railway; and to provide vehicles carrying electric motors, and each carrying a suitable contact roller, spring, or brush connected with the motor and adapted to bear upon the overhead conductor when the train is on the track, while the other terminal of the motor is connected with one or more of the wheels of the vehicle. I place the upward-pressure contact device on a support whose position normally, or when not in contact with the overhead conductor or otherwise under any external stress, is vertical, but which is flexibly mounted or constructed so that it may rock, yield, or bend in different directions, it being provided with a spring or springs which oppose this rocking, yielding, or bending tendency, and constantly raise the support toward a vertical position and hold the contact device in spring-contact with the conductor. I also so construct the contact device and the overhead conductor that they are in lateral engagement with each other, whereby, under a lateral movement of the support, the contact device is prevented from leaving the conductor. By this mode of supporting the contact device it is enabled to follow variations in the direction of the conductor relative to the track and variations in the height of the conductor relative to the car, and to conform to the direction of the motion of the car and to the movements of the car-body on its springs.

I may employ instead of the grounded main rails for the lower side of the system an insulated intermediate rail or rails, upon which bear suitable lower contacts of the motor.

I may employ a main conductor extending along the line of the road, as set forth in my patent, No. 317,235, which is connected at intervals with the overhead conductor or conductors of the one or more tracks of the system, and such overhead conductors may then be divided into sections by interposed insulating material.

My invention is applicable to a two-conductor multiple-arc system, or to the three-conductor multiple-series system set forth in my application Serial No. 150,353.

My invention is illustrated in the accompanying drawings, in which—

Figure 1 is a plan view or projection of a double-track two-conductor system embodying said invention; Fig. 2, a diagram of the circuits in a similar system employing a main conductor; Fig. 3, a section of an elevated railway employing this system; Fig. 4, a section of a similar railway employing an intermediate rail as one side of the circuit; Fig. 5, a diagram of the circuits of a three-conductor system embodying my invention; Fig. 6, a section of an elevated railway employing this three-conductor system; Fig. 7, a view of two crossing overhead conductors; Fig. 8, a view of a motor such as is used with my invention; Fig. 9, a view of a support for the overhead conductors, and Fig. 10 a view of a form of contact which may be employed.

Referring first to Figs. 1, 2, 3, and 8, A A represent one track, and B B another, of a railway. In Fig. 3 the railway is shown upon an elevated structure C; but it may be a surface road or an underground road instead.

In the elevated road a trestle or other support D D is erected above the tracks, and upon this trestle, above each track, is supported a rigid conductor E or E', which follows the line of the track beneath it, and is preferably placed directly above the middle of the track. At a point where a switch-track crosses from one main track to another, as shown in Fig. 1, an overhead conductor $E^2$ or $E^3$ follows the switch-track and is connected with the overhead conductor of the opposite track. The course of these crossing conductors is shown in Fig. 2, in which the tracks are omitted.

F, Fig. 2, is a main conductor, which extends continuously along the railway-line. This conductor may be placed in any convenient position. It is connected at intervals with the overhead system by branch conductors $a\ a$. In the arrangement shown in Fig. 3 there are shown two main conductors F and F', placed in a tube $F^2$. Here branch conductors $a\ a$ connect main conductor F with the overhead side of the system, and branch conductors $b\ b$ connect main conductor F' with the rails A A and B B. In this case the rails are preferably, though not necessarily, insulated from the earth, and the return-circuit is only by conductor F'; but where main conductor F is used alone the rails of the track form the return-circuit.

G represents the generator or generators at the supplying-station. There may be any suitable number of generating-stations situated at different points along the line, according to the length of the line and the power required. One terminal of the generator or group of generators at the station is connected, if there is only one main conductor, as in Fig. 2, by supply-conductor $p$ with said main conductor F and by supply-conductor $n$ with the track-rails; or, if there are two main conductors, the supply-conductors are connected one to each of said main conductors, as in Fig. 3.

H is a car or other vehicle carrying an electro-dynamic motor I, which propels the car. Upon the top of the car is placed the overhead contact. That shown consists of a wheel $b$, bearing upon the overhead rigid conductor. This wheel is carried upon an axle $c$, supported by the forked arms $d$ and preferably insulated from said arms, which are pivoted at $e$ upon the part $f$, which consists of two bent springs $g\ g$, attached to the top of the car. This form of support has normally a vertical position, but can rock laterally of the car on the pivot $e$, and with less freedom can rock, yield, or bend longitudinally of the car on the springs $g\ g$, which springs, however, oppose this rocking, yielding, or bending tendency, and tend constantly to raise the support and contact-wheel toward a vertical position against the overhead conductor. Since the support can rock laterally at one point and vertically at another, it can by the union or resultant of such vertical and lateral movements rock, yield, or bend in any direction from its normal vertical position, and therefore forms a universally-flexible support, yielding downwardly in any direction, but with such yielding tendency opposed by the springs, so that the contact device remains in effective engagement with the conductor, and when relieved from external stress of any kind assumes its normal vertical position. Additional springs $h\ h$ are provided, which assist in opposing the rocking movement of the support and in maintaining the support in a vertical position, and which are adjustable, so that the tension of the contact and its lateral and vertical position may be adjusted. From the upper contact connection is made to one terminal of the motor, and the other terminal is connected with the running-wheels of the car. The devices for regulating the mechanical effects of the motor shown in Fig. 8 will be presently described.

The circuit is as follows in the arrangement of Fig. 2: by supply-conductor $p$ to main conductor F, branch conductors $a\ a$ to overhead conductors E E', &c., through such motors I as are on the line to the track, and by supply-conductor $n$ back to the generator or generators. In the arrangement of Fig. 3 circuit is by $p$ to F, by $a\ a$ to E and E', through motors to track-rails, by $b\ b$ to F', and by $n$ to the generators.

It is evident that the continuous main conductor or conductors may be omitted and the supply-conductors connected directly to the overhead system, which arrangement is shown in Fig. 1. I prefer, however, to employ the main conductor or conductors in order to increase the current-carrying capacity of the system and to allow of the division of the overhead conductors into separately-supplied sections, if it is desired to do this. If they are so divided, the arrangement of continuous main conductors and separate sectional working-conductors from which the motors derive current is produced, which is claimed in my patent, No. 317,235, dated May 5, 1885, for the overhead conductor and the traffic rails or the intermediate rail or rails, as the case may be, of one track form a set of working-conductors, while the overhead conductor and rail or rails of the other track form another set, and the motors of a set are in parallel circuit to one another. Like conductors of the two sets are connected together at different points by the switch-tracks and the corresponding overhead lines, whereby the two sets are maintained at the same potentials at all points.

In Fig. 4 the main rails of the track are not included in the circuit, but an intermediate insulated conductor or central rail $k$ is placed between the main rails of each track, and a contact-roller $l$, forming one terminal of the motor, travels upon this rail $k$. Instead of a roller $l$, a brush or other form of contact may be used. Main conductor F′ is in this case connected with rails $k$, instead of with rails A and B. The central rails $k$ will follow the lines of the main tracks and switches the same as the overhead conductors which form the opposite side of the circuit.

Referring now to Figs. 5 and 6, three main conductors are employed—the positive F, the negative F′, and the middle or balance conductor $F^3$. At each generating-station generators G G′ are connected in series, one terminal of the series being connected with conductor F, the other with conductors F′, while conductor $F^3$ is connected between the generators, so as to form a divided source of supply. Two overhead conductors are provided for track A A—one $E^4$ connected by branch conductor $a$ with main conductor F, and the other $E^5$ by branch conductor $a'$ with main conductor F′—while the two overhead conductors $E^6$ and $E^7$ for track B B are connected by branch conductors $b$ and $b'$ with main conductors F and F′, respectively. The middle main conductor $F^3$ is connected with the rails of both tracks, as shown, or with both middle rails where these are used.

The upper contact of a motor for use with the three-conductor system is not placed at the middle of the vehicle, but on one side of the middle, so as to make contact with one of the two overhead conductors.

As each motor is connected between an overhead conductor and the track, it follows that each is connected between a main conductor and the middle or balance conductor, and the motors are thus in multiple series with a balance-wire between them. A general railway system of this character is set forth in my application, Serial No. 150,353. When in this system a motor runs from one track to the other, its overhead contact runs upon an overhead conductor of the other track, which is connected with the same main conductor as the overhead conductor upon which such contact previously ran, and the motor thus remains upon the same side of the system as before.

All the switches and appliances for changing the connections and conditions of the circuits and the motors set forth in the application just referred to may be employed with the three-wire system herein set forth.

A three-wire overhead-conductor system may in some cases be employed, in which only one overhead conductor is employed for each track. In this system the overhead conductor of one track is connected with main conductor F, that of the other track with main conductor F′, and balance-conductor $F^3$ is connected to both tracks or both middle rails, as before. In this case there is no connection between overhead conductors at switch-crossings, and the cars have to be moved from one track to the other by their momentum, and such movement from one track to the other changes the motor from one side of the system to the other. In this case the contact is preferably at the middle of the car-roof.

The overhead conductor may be of any suitable form and supported in any suitable manner. I prefer to support it upon hangers, as in Fig. 8, which represents a portion of a section of a tunnel.

K is the roof of the tunnel. Screws or bolts $u$ $u$ support an insulating-strip $s$, which carries a metal rail $t$, having a rib or flange on each side. The contact-roller rolls between these ribs, and the roller and the conductor being thus in lateral engagement with each other the roller is prevented from leaving the conductor under a lateral movement. This is shown enlarged in Fig. 9. It will be seen that the system is very readily applicable to underground roads and those in mines and tunnels.

Where, in the three-wire system shown, two overhead conductors cross each other, as in crossing switches, both are curved upwardly, so that neither is in the way of the contact-roller running on the other. This arrangement is seen in Fig. 7.

The overhead conductor may be in sections connected by expanding joints to permit contraction and expansion. This connection may be by means of an ordinary fish-plate, as shown.

Fig. 10 illustrates a form for the overhead contact. This is a "roller-brush," consisting of a circular body or hub $m$, upon the periphery of which are a number of springs $o$ $o$, bent in the same direction. This roller rolls upon the overhead conductor, and the numerous springs make good electrical contact therewith.

It is evident that many other forms for the overhead conductors and the contacts moving thereon than those shown may be employed. For surface roads the overhead conductors are supported in a similar manner to that shown for the elevated railways.

The trestles or supports employed may be of any suitable form. Several different forms are illustrated in the drawings.

In Fig. 8 the preferred connections and regulating apparatus for a motor are illustrated. These are the same as those set forth in several prior applications made by me. A circular commutator M is employed, to two opposite blocks of which the two contact-terminals are connected by wires 1 2. The field-magnets of the motor are wound in sections connected together, and from the sections on one leg of the magnet connections 3 3 are made to blocks on one side of the commutator, and from the other leg similar connections are made to opposite blocks. On the commutator are two pairs of arms $r\ r$ and $r'\ r'$. From arms $r\ r$ wires 4 4 extend to the commutator-brushes of the motor, and from arms $r'\ r'$ wires 5 5 extend to a set of independent field-coils wound on both legs of the field-magnet. Part of each arm $r'$ is broken away in the drawings for clearness of illustration. By moving arms $r\ r$ the armature is shunted upon a greater or less number of field-coils, whereby the armature-current is varied.

By moving arms $r'\ r'$ the current in the independent series of field-coils is varied or reversed, whereby the strength of the field-magnet is changed and the speed or power or both of the motor are varied.

The supplying-generators are provided with suitable regulating means. Those shown are adjustable resistances O in their field-circuits.

I do not claim herein the two sets of working-conductors supplied from a common source, the motors on one set being in parallel circuit with those on the other set, or the two sets with the motors on each set in parallel circuit with each other, or the continuous main conductors connected at intervals with the two sets of working-conductors, or the use of cross-connections between the sets of working-conductors, for these features will form the subject of another application for Letters Patent.

I do not claim in this application the combination of a car, an overhead conductor above the car, an upwardly-extending and laterally-movable arm carried by the car, having its upper end free, and a contact device carried by the arm at its free end, and making underneath contact with the conductor, this being the subject-matter of an interference in which my application filed November 5, 1888, is involved.

What I claim is—

1. In an electric railway, the combination, with a car provided with an electric motor mounted upon and propelling it, of an overhead conductor, a contact device carried by the car and traveling on the under side of said conductor, and a rocking support for said contact device, whose normal position is vertical, substantially as set forth.

2. In an electric railway, the combination, with a car provided with an electric motor mounted upon and propelling it, of an overhead conductor, a contact device carried by the car and traveling on the under side of said conductor, and a laterally-rocking support for said contact device, substantially as set forth.

3. In an electric railway, the combination, with a car and an electric motor mounted upon and propelling it, of an overhead conductor, a contact device carried by the car and traveling on the under side of said conductor, and a hinged support for said contact device, whose normal position is vertical, substantially as set forth.

4. In an electric railway, the combination, with a car and a motor mounted upon and propelling it, of an overhead conductor, a contact device carried by the car and traveling on the under side of said conductor, and a normally vertical support for said contact device hinged on an axis longitudinal of the car, substantially as set forth.

5. In an electric railway, the combination, with a car and an electric motor mounted upon and propelling it, of an overhead conductor, a contact device carried by the car and traveling on the under side of said conductor, and a rocking support for said contact device, whose normal position is vertical and which is provided with a spring tending to maintain said support in a vertical position, substantially as set forth.

6. In an electric railway, the combination, with a car and an electric motor mounted upon and propelling it, of an overhead conductor, a contact device carried by the car and traveling on the under side of said conductor, and a hinged support for said contact device, whose normal position is vertical and which is provided with a spring tending to maintain said support in a vertical position, substantially as set forth.

7. In an electric railway, the combination, with a car and an electric motor mounted upon and propelling it, of an overhead conductor, a contact device carried by the car making an underneath contact with said conductor and in lateral engagement therewith, and a rocking support for said contact device, substantially as set forth.

8. In an electric railway, the combination, with a car and an electric motor mounted upon and propelling it, of an overhead conductor, a contact device carried by the car making an underneath contact with said conductor and in lateral engagement therewith, and a laterally-rocking support for said contact device, substantially as set forth.

9. In an electric railway, the combination, with a car and an electric motor mounted upon and propelling it, of an overhead conductor, a contact device carried by the car making an underneath contact with said conductor and in lateral engagement therewith, and a rocking support for said contact device, and springs tending to maintain said support in a vertical position, substantially as set forth.

10. In an electric railway, the combination, with a car and an electric motor mounted upon and propelling it, of an overhead conductor, a contact device carried by the car and traveling on the under side of said conductor, a support for said contact device adapted to yield downwardly on either side of a center in the direction of length of the car, and a spring tending to raise said support toward a vertical position, substantially as set forth.

11. In an electric railway, the combination, with a car and an electric motor mounted upon and propelling it, of an overhead conductor, a contact device carried by the car and traveling on the under side of said conductor, a support for said contact device adapted to yield downwardly in the direction of length of the car and also in the direction of width thereof, and a spring or springs tending to raise said support toward a vertical position, substantially as set forth.

12. In an electric railway, the combination, with a car and an electric motor mounted upon and propelling it, of an overhead conductor, a contact device carried by the car and traveling on the under side of said conductor, and a support for said contact device made flexible at two points, so as to yield downwardly laterally of the car at one point and longitudinally of the car at another point, substantially as set forth.

13. In an electric railway, the combination, with a car and an electric motor mounted upon and propelling it, of an overhead conductor, a contact device carried by the car and traveling on the under side of said conductor, a support for said contact device, whose normal position is vertical and which is adapted to yield downwardly in any direction from such vertical position, and a spring or springs opposing such yielding of the support, substantially as set forth.

14. In an electric railway, an overhead conductor for receiving an underneath traveling contact, consisting of a flat web having downwardly-extending side ribs or flanges for guiding the contact, substantially as set forth.

15. In an electric-railway system, the combination of a divided source of electricity, main conductors, and a compensating or balance conductor, dividing the system into two parts, and one or more overhead conductors and one or more other working-conductors for each of said parts of the system, substantially as set forth.

16. In an electric-railway system, the combination of a divided source of electricity, main conductors, and a compensating or balance conductor dividing the system into two parts, two railway-tracks, two conductors situated above each track, each connected with one of said main conductors, and the rails of both tracks connected with the middle or balance conductor, substantially as set forth.

This specification signed and witnessed this 4th day of February, 1885.

FRANK J. SPRAGUE.

Witnesses:
A. W. KIDDLE,
E. C. ROWLAND.